Dec. 15, 1925.  J. W. MACKLIN  1,566,028
TIRE AND RIM CONSTRUCTION
Filed Dec. 15, 1923    2 Sheets-Sheet 1

INVENTOR
Justin W. Macklin.
BY Bates & Macklin
ATTYS.

Dec. 15, 1925.                J. W. MACKLIN                1,566,028
                          TIRE AND RIM CONSTRUCTION
                    Filed Dec. 15, 1923        2 Sheets-Sheet 2

INVENTOR
Justin W. Macklin.
By Bates & Macklin
ATTYS.

Patented Dec. 15, 1925.

1,566,028

UNITED STATES PATENT OFFICE.

JUSTIN W. MACKLIN, OF LAKEWOOD, OHIO, ASSIGNOR TO JACKSON D. COMSTOCK, OF CHESTER, WEST VIRGINIA.

TIRE AND RIM CONSTRUCTION.

Application filed December 15, 1923. Serial No. 680,838.

*To all whom it may concern:*

Be it known that I, JUSTIN W. MACKLIN, a citizen of the United States, residing at Lakewood, in the county of Cuyahoga and State of Ohio, have invented a certain new and useful Improvement in a Tire and Rim Construction, of which the following is a full, clear, and exact description, reference being had to the accompanying drawings.

The object of this invention is to provide a simple, effective means for preventing circumferential slipping or creeping of automobile tire casings on the rim, a more specific object is to so arrange the construction for preventing this creeping as to take advantage of certain features of standard tire construction and common practices in rim manufacture.

With the present tendency towards larger cross-sectional diameter of tire casings and the use of very much lower pressure, coupled with consequent smaller rim diameter with relation to the tread diameter, the tendency of the casing to creep on the rim in the normal use of the same is very pronounced. The present invention eliminates this difficulty without interfering with well established practices, as stated above, and assures permanent positioning of the tire casing on the rim and is accomplished at a very insignificant cost.

In the accompanying drawings I have illustrated my invention as embodied in rims on which are mounted the now very widely used form of tire casings, open along the inner periphery between the comparatively rigid bead portions, the casing containing the usual inner tube and being mounted upon a channel-like rim having a substantially flat base from which rise the side flanges of the flaring straight side or inturned clincher type.

The above and other objects will become more apparent in the following description which relates to the accompanying drawings illustrating preferred embodiments of my invention. The essential characteristics are summarized in the appended claims.

Figure 1:
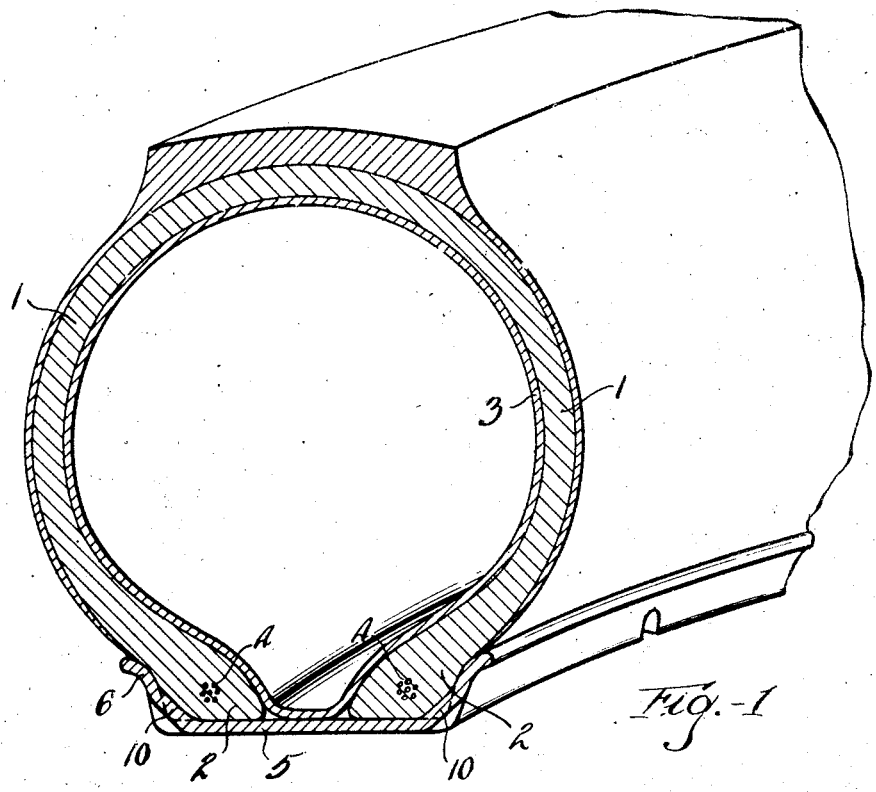
Figure 2:
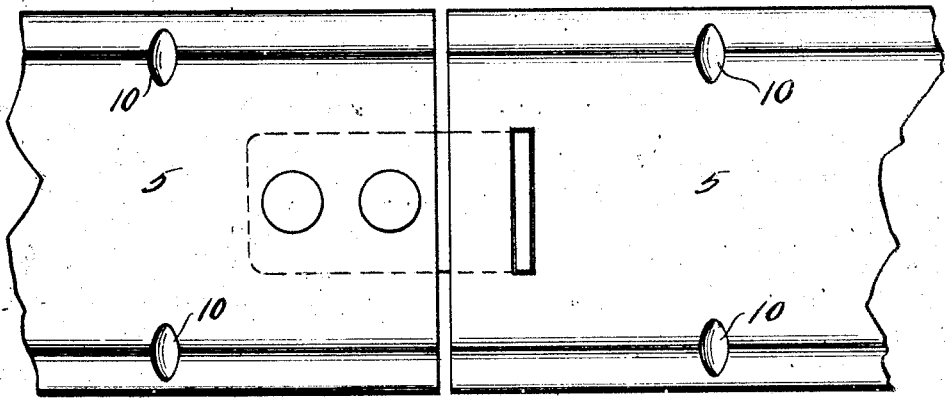
Figure 3:
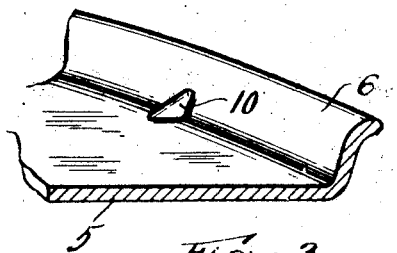
Figure 4:
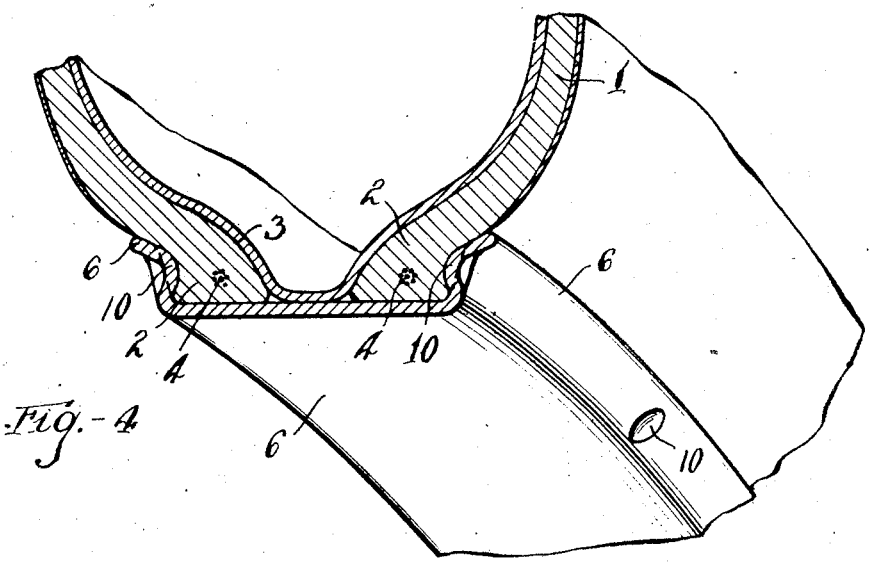
Figure 5:
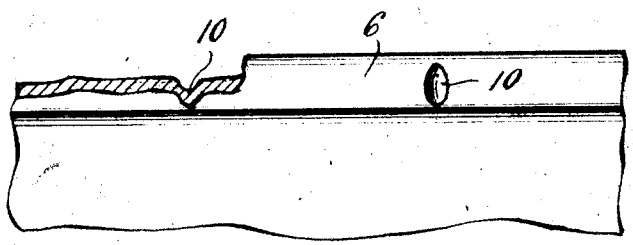
Figure 6:
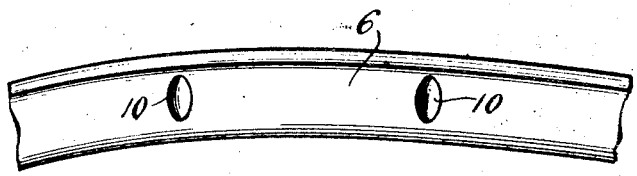
Figure 7:
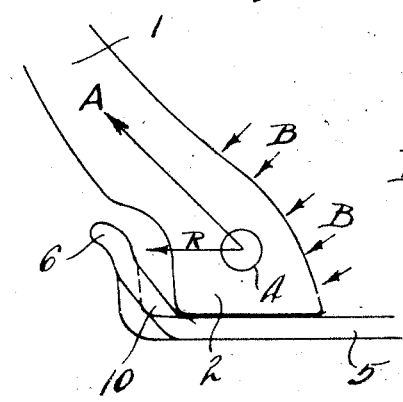

In the drawing Fig. 1 is a sectional perspective of a tire casing in position on a rim embodying my invention. Fig. 2 is a plan of a section of such rim of the usual split type showing the joint. Fig. 3 is a sectional perspective of a portion of such a rim. Fig. 4 is a sectional perspective of a straight side split rim with the tire mounted thereon, illustrating a modified part of the invention. Fig. 5 is a sectional plan of the same showing a fragment of the rim. Fig. 6 is a side elevation of a portion of such a rim. Fig. 7 is a diagrammatic view taken across a portion of the rim and tire bead illustrating the action of the forces rendering the invention effective.

Referring to the embodiment shown in Figs. 1, 2 and 3 the invention is applied to a straight side channel type of split rim. Designating the parts shown by the use of reference characters,—1 indicates a standard well known type of tire casing construction having the usual tread portion, side walls and bead portion 2, with the non-extensible bead rings or grommets 4. 5 indicates the rim having the upwardly and outwardly turned side flanges 6. 3 indicates the usual inner tube within the casing. At the angle between the base of the rim and the side flanges I form at intervals inwardly projecting short transverse ribs or knobs indicated at 10. These knobs may be formed while the rim material is being rolled or formed by depressing the metal inwardly across the angle between the base and side-flange, there being projections on one die or roll corresponding with depressions on the other die or roll, the latter of which makes these humps fairly abrupt and causes them to present an upwardly facing corner as shown. These knobs have an effect corresponding somewhat to driving lugs and are preferably arranged at intervals of a few inches apart, entirely around the rim and at either side thereof. The distance which they project into the flat portion of the base of the rim is preferably not such as to interfere with the placing of the tire on the rim, that is, when the tire is deflated the two bead portions may be brought quite close together or in contact with each other and when the rim is placed within the tire casing, and expanded into place in the usual manner, these inwardly sloping projections will push the bead portion of the casing inwardly from the position such as that shown in dotted lines, for example, in Fig. 1. Were these projections to rise from the base of the rim or to project too far toward the center of the rim base, the placing of the tire thereon would be interfered with because if the two beads are forced together they would bridge from one transverse rib to another and there would wedge upon them, at a distance above the base of the rim, with the result that the expansion of the rim into place would be difficult.

It will be noted that as shown these ribs extend across the outer corner of the beads which in the usual tire casing of this type is formed by molding the rubber and fabric into a stiff rigid portion assuming the shape shown, and except for the substantially idle inner edge or point of the bead, this outer corner is the thickest portion from the bead or grommet, and when the tire is seated firmly against the side walls of the rim with the beads assuming the position shown, these transverse rib knobs impress themselves into firm and rigid material of the bead, but do not injure or destroy the effectiveness of the bead, inasmuch as they do not impress themselves towards the grommet any closer than the upper surface of the bead is to the grommet. In other words, they are impressed into and form corresponding notches in the filler or idle portion of the beads, consequent upon the outward movement of these beads to the rim flanges when the tire is inflated.

I thus provide at each side of the tire base, in effect, a pair of oppositely facing shoulders on each flange and complementary shoulders fitting against the same on the tire bead and with these at intervals around the entire rim, the consequent relative circumferential movement of tire and rim is entirely prevented, even when subjected to the severe strains of driving action or of braking effect.

When such a tire is inflated there is, of course, an outward pull on the side walls and in fact, the entire casing tends to expand circumferentially which is counteracted by the nonextensible bead rings. This effect, however, is sufficient to prevent any tight contacts between the base of the beads and the base of the ring or rim, while the frictional driving action is effected only by the pressure of the outer sides of the beads against the straight sides of the rim. With the lower pressure tires, it will be seen that this frictional effect is very much reduced, while on the other hand the use of my invention affords a very simple means of preventing the slipping of casing around the rim with greater certainty than the friction only even under the highest pressures used heretofore.

A modified construction which also takes advantage of this side pressure of the beads against the inner sides of the rims, and which has some of the other advantages above set out, is illustrated in Figs. 4 to 6 in which the base of the rim is designated 5, the side flanges 6 retaining the tire 1. Short rib-like knobs 20 are depressed inwardly in the side flanges as indicated and terminate above the base as shown. In this form the knobs or ribs are formed by inwardly pressing the entire thickness of the material to facilitate the formation during the rolling of the rim and when in use engage a thickened portion of the tire bead and yet do not interfere with placing the rim into the tire.

A brief summary of the more pronounced actions of the pressure within the tire causing seating of the tire in a rim and causing the projections 10 or 20 to form depressions in the thickened portion of the bead when the tire is inflated, may make more clear the advantages of my invention. Referring to Fig. 7 the expanding of the internal pressure acts upon the ring or grommet circumferentially of the cross section of the tire casing. This force is very great and may be represented by an arrow A. At the bead portion there is of course a local expansive pressure the same as throughout the rest of the internal surface, as indicated by the small arrow B, which tends to force the bead radially inwardly somewhat, but the much greater outward force A acting on the substantially rigid bead ring gives an outwardly acting resultant which may be indicated approximately by the line R. Thus, it will be seen that the thickened portion of the bead will be forced tightly against the radial surface of the side flange, incidentally forming a depression therein at each inward projection, while these forces may almost entirely eliminate any inward radial pressure against the base of the rim. In fact, after a tire has been fully inflated and becomes partially deflated, looseness and separation between the base of the bead and the base of the rim occurs, though the side of the bead may still be seated against the flange.

My invention is intended to include such modifications and alterations as may come within the scope of the appended claims and I do not wish to be limited to the precise embodiments shown.

Having thus described my invention, what I claim is

1. A tire casing having bead portions of thickened fabric and rubber formed to fit straight side rims, and a rim provided with inwardly extending projections presenting an edge diagonally across the inner corner between the flange and base and adapted to form a depression in the outer lower corner of the bead consequent upon inflation.

2. A tire casing having bead portions of thickened fabric and rubber and a rim adapted to be formed from sheet metal, said rim being provided with inwardly extending projections each projection presenting an edge adapted to form a depression in the outer portion of the bead consequent upon inflation and said projections being formed by pressing the body of the metal inwardly.

In testimony whereof, I hereunto affix my signature.

JUSTIN W. MACKLIN.